United States Patent [19]
Yoshinaka

[11] 4,100,567
[45] Jul. 11, 1978

[54] COMPENSATING TIME-BASED ERRORS IN A REPRODUCED VIDEO SIGNAL

[75] Inventor: Tadaaki Yoshinaka, Yokohama, Japan

[73] Assignee: Sony Corporation, Tokyo, Japan

[21] Appl. No.: 777,542

[22] Filed: Mar. 14, 1977

[30] Foreign Application Priority Data

Mar. 17, 1976 [JP] Japan .................................. 51-28991

[51] Int. Cl.² .............................................. H04N 5/79
[52] U.S. Cl. .................................................... 358/8
[58] Field of Search ......................................... 358/4, 8

[56] References Cited

U.S. PATENT DOCUMENTS 3,704,341 11/1972 Fujita ....................................... 358/8

FOREIGN PATENT DOCUMENTS 2,276,750 1/1976 France ....................................... 358/8

Primary Examiner—Robert L. Richardson
Attorney, Agent, or Firm—Lewis H. Eslinger; Alvin Sinderbrand

[57] ABSTRACT

Apparatus for use with a video signal playback system of the type which reproduces a previously recorded composite color video signal wherein time-base errors appear in the luminance component of that video signal. The apparatus modifies the chrominance component of the composite video signal so as to have time-base errors in correspondence with the errors in the luminance component. The luminance and chrominance components are separated from the composite color video signal; and a local subcarrier reference signal is generated to have the time-base errors which are present in the luminance component. This local subcarrier reference signal is essentially substituted for the subcarrier of the reproduced chrominance component, thereby imparting such time-base errors into the chrominance component. At least the chrominance component is delayed by an amount equal to a horizontal line interval so as to equalize the time-base errors which have been imparted into the chrominance component with those time-base errors which are contained in the reproduced luminance component. The delayed luminance component and the substituted-subcarrier chrominance component are combined so as to reform the composite color video signal.

10 Claims, 5 Drawing Figures

COMPENSATING TIME-BASED ERRORS IN A REPRODUCED VIDEO SIGNAL

BACKGROUND OF THE INVENTION

The present invention relates to video signal playback systems and, more particularly, for apparatus whereby time-base errors that are introduced into a composite color video signal which is reproduced by a video signal playback system are compensated. A particular feature of this invention relates to equalizing the time-base errors in a chrominance component of the reproduced composite color video signal with the time-base errors which have been introduced into the luminance component.

In a typical video signal recording system, such as a video tape recorder (VTR), a composite color video signal is separated into its chrominance and luminance components, and these separated components generally are processed and recombined for recording in oblique tracks across a moving magnetic medium, such as magnetic tape. The recording transducer typically is formed of a pair of magnetic recording heads which are rotated, for example, at a speed of thirty rotations per second.

Once the magnetic medium, such as tape, has been recorded, the recorded composite color video signals are reproduced by a compatible video signal playback system. In many instances, the video signal playback system comprises the playback section of the video recorder. However, as frequently occurs, a different video playback system may be used to reproduce the previously recorded composite color video signals.

It is possible that, during playback, the rotary speed of the magnetic heads and/or the linear speed of the magnetic medium may differ from that during recording. Although servo systems generally are used to control the rotary speed of the magnetic heads and the linear speed of the medium, nevertheless, speed fluctuations may occur. Also, if magnetic tape is used as the recording medium, it is possible that this tape may be subjected to a change in dimension, such as tape shrinkage or stretching, subsequent to the recording operation. All of these possible variations result in errors in the frequency and phase of the recorded and reproduced composite color video signals. Such errors, known as time-base errors, cause undesirable observable effects in the ultimately reproduced color video picture. Such effects appear as jitter, brightness distortion and improper color display. If these effects are provided in the reproduced composite color video signal which is to be used in connection with the transmission of a television broadcast, it is important that the time-base errors be corrected.

In one type of video signal playback system, the previously recorded composite color video signal whose luminance and chrominance components had been separately processed, is reproduced and the reproduced luminance and the chrominance components are separated. The chrominance component, which had been frequency converted to a range of frequencies less than the original chrominance component frequency range is reconverted back to such original frequency range. To effect such frequency reconversion, a local controllable oscillator is locked to the frequency converted subcarrier included in the reproduced chrominance component. Thus, if the reproduced subcarrier contains any time-base errors, the frequency reconversion operation essentially eliminates such time-base errors. Then, the frequency reconverted chrominance component, whose time-base errors have been corrected, is combined with the luminance component so as to reform the original composite color video signal. However, although the time-base errors have been removed from the chrominance component, such time-base errors still may be present in the luminance component, including the vertical and horizontal synchronizing signals. Accordingly, in many instances, additional time-base correcting circuitry is relied upon to receive the composite color video signal which has been reproduced by the video signal playback system and to correct the time-base errors present in such composite color video signal. An example of one type of time-base correcting circuitry is disclosed in copending application Ser. No. 642,197, assigned to the assignee of the present invention.

Another example of time-base error correcting apparatus is described in U.S. Pat. No. 2,979,558. In that apparatus, the burst signal included in a reproduced composite color video signal is separated and used to synchronize, or lock, an oscillator, such as the so-called start-stop oscillator. Hence, in the event that the time-base errors in the chrominance component reproduced by the video playback system have not been corrected, the output from this oscillator will contain such errors. The output from this oscillator is used to produce a frequency converting signal which also contains the time-base errors. This frequency converting signal then converts the frequency of the chrominance component, whereby the time-base errors in the frequency converting signal and the time-base errors in the chrominance component are substantially equal and cancel each other. However, in this prior art system, there is no recognition of the time-base errors which also are present in the luminance component, and particularly in the horizontal synchronizing signal which is included in such luminance component. Furthermore, by locking the local oscillator to the separated burst signal, the time-base errors which are imparted into the oscillator output lag the actual time-base errors which are contained in the chrominance component by one horizontal line interval. This is because the burst signal is present only at the beginning of the horizontal line interval and, therefore, the local oscillator is provided with the time-base errors which are present only during the beginning portion of that horizontal line interval. While these time-base errors may change over the duration of the horizontal line interval, the locked oscillator cannot follow such changes.

In another proposal for correcting time-base errors which may be present in the chrominance component of a reproduced color video signal, as described in U.S. Pat. No. 3,075,041, the color information which is modulated onto a subcarrier is demodulated, or decoded, therefrom and then is remodulated, or encoded, onto another subcarrier. If the phase or frequency of the reproduced subcarrier changes because of time-base errors, it is necessary to generate a local reference signal which is synchronized with the reproduced subcarrier and to use this local reference signal for decoding the color information. Once decoded, a local subcarrier generated by a highly regulated oscillator, such as a crystal oscillator, is used for encoding. However, this system suffers from the same disadvantage found in the aforenoted system, viz., the local reference signal is generated by a so-called color lock oscillator which is controlled by the burst signal included in the reproduced chrominance component, and therefore lags the time-base errors in the chrominance subcarrier by one horizontal line interval.

OBJECTS OF THE INVENTION

Therefore, it is an object of the present invention to provide improved apparatus for compensating for time-base errors which are present in a composite color video signal which is reproduced by a video signal playback system.

Another object of this invention is to impart time-base errors into the chrominance component of a reproduced composite color video signal, which time-base errors are equalized with the time-base errors contained in the luminance component.

An additional object of this invention is to provide time-base error compensating apparatus for imparting a time-base error into a reproduced chrominance component which corresponds to the inherent time-base error contained in the reproduced luminance component of a composite color video signal.

A further object of this invention is to provide apparatus for compensating for time-base errors in a composite color video signal which overcomes the aforenoted problems attending prior art time-base correcting systems.

Yet another object of this invention is to provide time-base error compensating apparatus for use with a video signal playback system, wherein a time-base error is imparted into the chrominance component of the reproduced composite color video signal, this time-base error being substantially in phase with the time-base error contained in the luminance component of the reproduced composite color video signal.

A still further object of this invention is to provide time-base error compensating apparatus which eliminates the phase delay between the chrominance and luminance time-base errors in a video signal playback system.

Various other objects, advantages and features of the present invention will become readily apparent from the ensuing detailed description, and the novel features will be particularly pointed out in the appended claims.

SUMMARY OF THE INVENTION

In accordance with the present invention, apparatus is provided for compensating time-base errors which are present in a composite color video signal which is reproduced by a video signal playback system. The apparatus includes separating circuits for separating the luminance and chrominance components from the reproduced composite color video signal; a controlled local oscillator which generates a local subcarrier reference signal which contains the time-base errors that are present in the reproduced composite color video signal; a circuit for replacing the chrominance subcarrier in the reproduced chrominance component with the time-base error local subcarrier reference signal; a delay circuit for imparting a delay equal to one horizontal line interval to at least the luminance component; and a combining circuit for combining the delayed luminance component with the subcarrier-substituted chrominance component so as to reform the composite color video signal wherein both the luminance and chrominance components have substantially equal time-base errors.

The reformed composite color video signal can be applied to a suitable time-base corrector, such as that described in aforementioned application Ser. No. 642,197, whereby these time-base errors can be corrected.

BRIEF DESCRIPTION OF THE DRAWINGS

The following detailed description, given by way of example, will best be understood in conjunction with the accompanying drawings wherein.

DETAILED DESCRIPTION OF CERTAIN PREFERRED EMBODIMENTS

Figure 1:
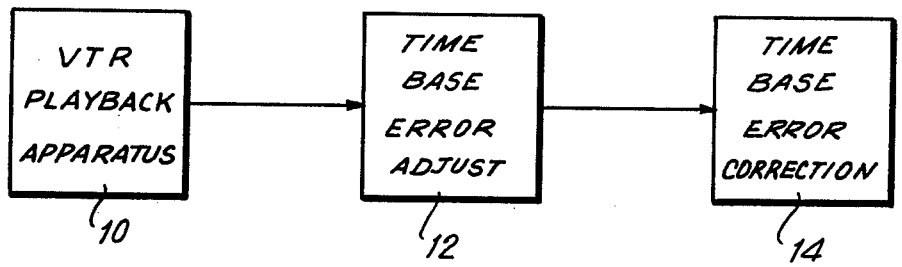
FIG. 1 is a block diagram showing the overall system wherein the apparatus of the present invention can be used.

Referring now to the drawings, wherein like reference numerals are used throughout, and in particular to FIG. 1, there is illustrated the overall contemplated use of the apparatus in accordance with the present invention. As shown, the time-base error adjustment apparatus 12, described in detail below, is used in conjunction with a video signal playback system 10 and a time-base error corrector 14. For the purpose of the present description, video signal playback system 10 is assumed to be a VTR playback device. However, it will be understood that other types of recording media can be used, together with a compatible signal playback system. For example, the recording medium may be a magnetic sheet. As another alternative, the recording medium may be an optically recordable medium and the video signal playback system may be an optical readout device. Regardless of the particular embodiment used, it will be assumed that time-base errors are present in at least the luminance component of the reproduced composite color video signal. As will be discussed below with respect to FIG. 2, it may be assumed that, although time-base errors are present in the chrominance component which is reproduced by the playback head in video signal playback system 10, such time-base errors are corrected, or eliminated from the chrominance component which is included in the composite color video signal at the output of the video signal playback system.

Time-base error adjustment apparatus 12 is described below with respect to FIGS. 3 and 5. This apparatus is adapted to impart time-base errors into the chrominance component of the composite color video signal, which time-base errors are substantially equal to those which are present in the luminance component. In addition, there is no time lag in the time-base errors which are present in the luminance component and which are imparted into the chrominance component. Contrary to prior art proposals, these time-base errors are substantially equalized.

Time-base error corrector 14 may be of the type described in aforementioned application Ser. No. 642,197. Accordingly, the equalized time-base errors which are present in the luminance and chrominance components of the composite color video signal produced at the output of time-base error adjustment apparatus 12 are readily corrected. Since such time-base errors are equalized in these respective components, distortion and undesired effects which otherwise result in the ultimately reproduced video picture are avoided.

Figure 2:
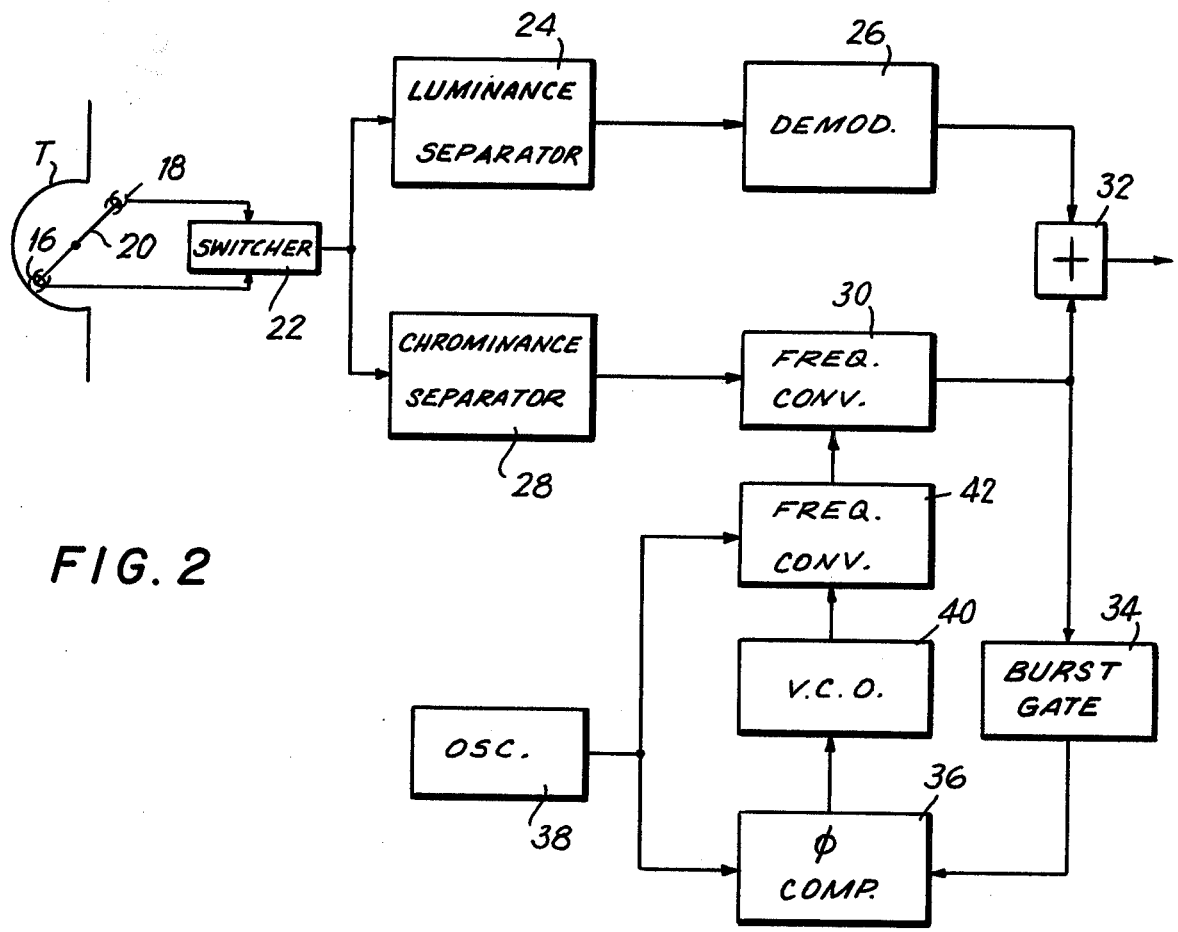
FIG. 2 is a block diagram showing broadly an embodiment of a video signal playback system with which the present invention can be used.

Turning to FIG. 2, there is illustrated a block diagram of one embodiment of a video signal playback system which can be used in block 10 of FIG. 1. It is assumed that this playback system operates upon magnetic tape T. The system is comprised of a pair of rotary magnetic heads 16 and 18 mounted on a suitable rotary support 20, each head being adapted to scan successive oblique tracks across tape T in the usual manner. It is further assumed that the composite color video signals which are recorded on tape T include a luminance component formed of luminance signals which are frequency modulated onto a carrier, and a chrominance component formed of chrominance signals which are modulated onto a subcarrier whose frequency has been converted to a range substantially less than the range encompassed by the frequency modulated luminance signals. Also included in the composite color video signal are vertical and horizontal synchronizing signals, including the burst signal, as is conventional.

The composite color video signals which are reproduced from tape T by heads 16 and 18 are coupled through a head-switcher 22 to luminance separator 24 and chrominance separator 28. Head-switcher 22 is adapted to selectively connect one or the other of heads 16 and 18 to the luminance and chrominance separators. Luminance separator 24 may be formed of a high pass filter adapted to transmit the higher frequencies included in the luminance component which is frequency modulated onto a carrier. A frequency demodulator 26 demodulates the separated luminance component so as to produce substantially the original luminance component.

Chrominance separator 28 may be formed of a low pass filter adapted to transmit the lower frequency range of the frequency converted chrominance component. A frequency converter 30 reconverts the subcarrier of the chrominance component back to its original frequency. As an example, the frequency converted subcarrier may have a frequency of approximately 688 KHz, and the original frequency of the subcarrier may be approximately 3.58 MHz. Thus, frequency converter 30 is adapted to convert the subcarrier of the reproduced chrominance component from 688 KHz to 3.58 MHz.

Because of head and/or tape speed fluctuations, changes in the tape dimensions, etc., time-base errors may be present in the composite color video signal reproduced by heads 16 and 18. These time-base errors may be contained in the luminance component which is separated by luminance separator 24 and in the chrominance component which is separated by chrominance separator 28. In one embodiment of a video signal playback system, these time-base errors are eliminated from the chrominance component by the frequency reconversion operation. In this regard, a frequency converting signal is produced to contain the time-base errors which are present in the chrominance component, and particularly in the burst signal. This frequency converting signal is produced by a phase-locked loop formed of burst gate 34, phase comparator 36, local oscillator 38, voltage-controlled oscillator (VCO) 40 and frequency converter 42. Burst gate 34 is coupled to the output of frequency converter 30 and transmits the burst signal which is present at the start of each horizontal line interval. As is conventional, the burst signal frequency is equal to that of the subcarrier upon which the color information signals are modulated. The burst signal frequency is approximately 3.58 MHz. Phase comparator 36 includes one input coupled to burst gate 34 and adapted to receive the burst signal, and another input coupled to local oscillator 38. Phase comparator 36 functions to compare the phase of the burst signal with the phase of the local oscillator and to generate an error signal proportional to the detected phase differential. This error signal is applied to VCO 40 and serves to control the center frequency of the VCO. As a numerical example, if the phase of the burst signal is equal to the phase of the local oscillating signal, VCO 40 operates at approximately 688 KHz. However, if a phase difference exists between the burst signal and the local oscillating signal, the VCO center frequency changes accordingly. Thus, the 688 KHz oscillating signal produced by VCO 40 contains the time-base errors which are present in the burst signal reproduced from tape T.

The time-base error output of VCO 40 and the signal produced by local oscillator 38 are applied to frequency converter 42, which may be a mixer. The upper side band of the mixed VCO and oscillator outputs (3.58 MHz + 0.688 MHz) is applied as the frequency converting signal to frequency converter 30. Since the 688 KHz component of the frequency converting signal includes substantially the same time-base errors as are present in the 688 KHz subcarrier of the reproduced chrominance component, these errors cancel in frequency converter 30, whose output is the lower side band of the mixed signals applied thereto. Hence, the frequency reconverted chrominance component produced by frequency converter 30 is substantially free of time-base errors, except for those errors which may not be corrected because of the inherent time delays in the phase-locked loop. In any event, such remaining errors essentially are imperceptible.

A combining circuit 32, such as a mixer or summing circuit, combines the frequency demodulated luminance component and time-base correctec chrominance component into a composite color video signal.

Although the time-base errors present in the reproduced chrominance component are corrected, time-base errors are present in the reproduced luminance component. For the purpose of a television broadcast transmission, such time-base errors should be corrected. However, if the composite color video signal produced by combining circuit 32 is applied directly to time-base corrector 14 (FIG. 1), undesired effects may result because the time-base corrector will treat the error-free chrominance component as if it contains time-base errors. Accordingly, time-base error adjustment apparatus 12 is provided to insert time-base errors into the chrominance component, which errors are equalized to the time-base errors included in the luminance component.

Figure 3:
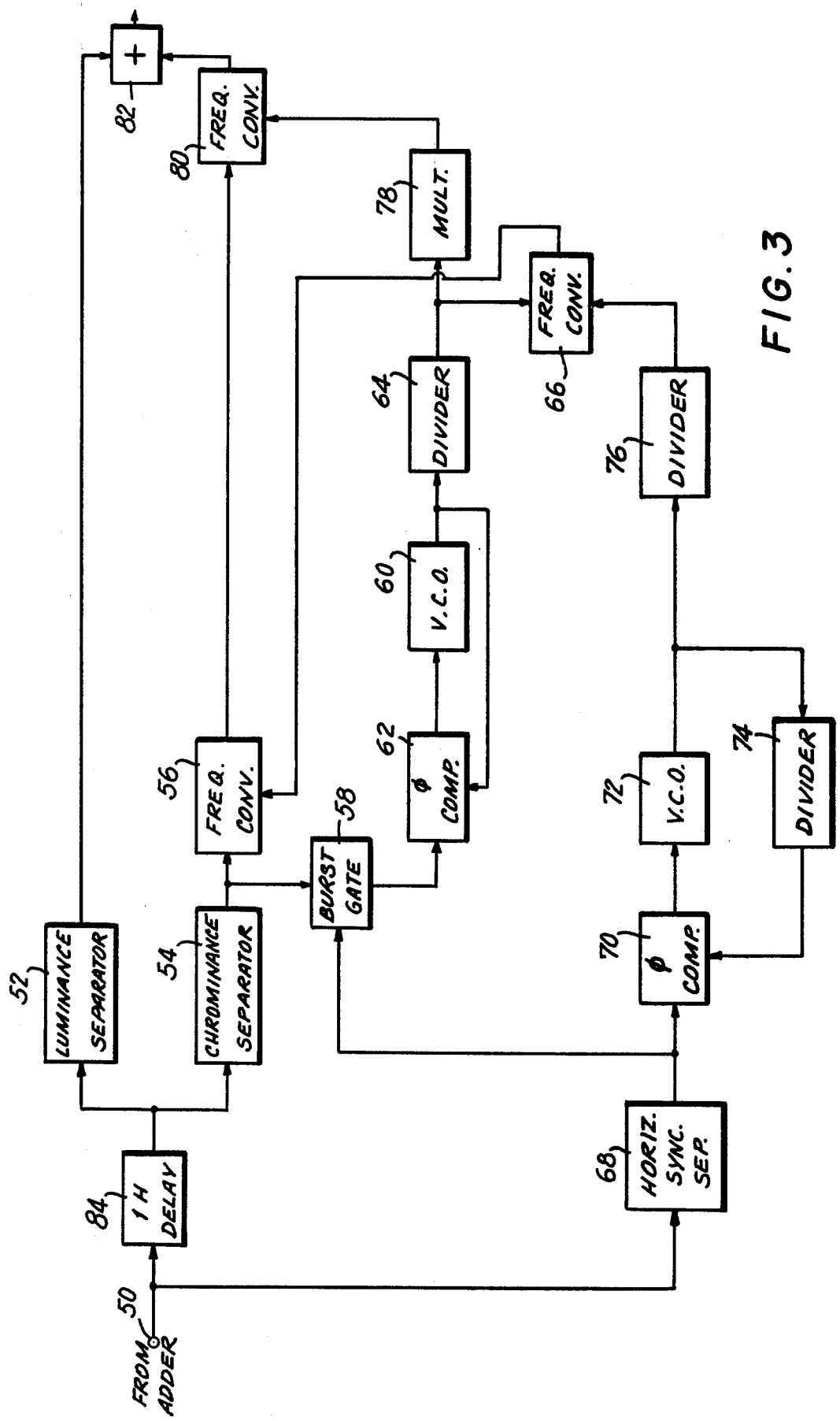
FIG. 3 is a block diagram of one embodiment of the present invention.

A block diagram of one embodiment of time-base error adjustment apparatus 12 is illustrated in FIG. 3. This apparatus is comprised of an input terminal 50, which may be coupled to combining circuit 32 (FIG. 2) for receiving the composite color video signal which is reproduced and processed by the illustrated video signal playback system. The received composite color video signal is applied to luminance separator 52 and chrominance separator 54, each being formed preferably of filter networks, which are adapted to separate the luminance component and the chrominance component, respectively, from the received composite color video signal. A frequency converter 56 is coupled to chrominance separator 54 and is adapted to convert the chrominance component to a different frequency range and to impart the time-base error included in the luminance component into the frequency-converted chrominance component. Another frequency converter 80 is coupled to frequency converter 56 and is adapted to return the frequency converted chrominance component back to its original frequency range, but maintaining the time-base errors in the reconverted chrominance component.

A local subcarrier reference signal is produced to contain the time-base errors included in the luminance component and, particularly, those time-base errors included in the horizontal synchronizing signal. This local subcarrier reference signal is applied to frequency converter 56 for converting the subcarrier of the chrominance component (3.58 MHz) to a different frequency, yet containing the time-base errors. This local subcarrier reference signal is generated by an oscillating circuit formed of horizontal synchronizing signal separator 68, phase comparator 70, voltage-controlled oscillator (VCO) 72 and frequency converter 66. Horizontal synchronizing signal separator 68 is a conventional circuit and is coupled to input terminal 50 so as to separate the horizontal synchronizing signal containing time-base errors from the composite color video signal which is applied to terminal 50. VCO 72 is adapted to generate an oscillating signal whose frequency is much greater than the horizontal synchronizing frequency. Accordingly, the output of VCO 72 is divided by frequency divider 74 and supplied to phase comparator 70. As one numerical embodiment, if the horizontal synchronizing frequency is 15.75 KHz, VCO 72 might generate an oscillating signal of approximately 7.16 MHz, and frequency divider 74 might exhibit a dividing factor of 455. Thus, the frequency of the signals applied to phase comparator 70 by horizontal synchronizing signal separator 68 and frequency divider 74 are equal. Any phase differential between these signals results in an error signal produced by phase comparator 70 and applied to VCO 72. This error signal controls the center frequency of VCO 72 so as to phase-lock the VCO with the horizontal synchronizing signals containing the time-base error. Thus, it can be said that the output of VCO 72 includes the time-base error information contained in the horizontal synchronizing signal, and thus the luminance component, of the composite color video signal which is supplied to input terminal 50 by the video signal playback system shown in FIG. 2.

The oscillating signal produced by VCO 72, containing the time-base error, is applied to frequency converter 66, preferably via a frequency divider 76. Consistent with the foregoing numerical example, frequency divider 76 may divide the frequency of the oscillating signal produced by VCO 72 by a factor of 2, thereby applying a 3.58 MHz time-base error signal to frequency converter 66.

Frequency converter 66 may comprise a mixer circuit and is adapted to mix the 3.58 MHz time-base error signal derived from VCO 72 with an oscillating signal that is synchronized, or phase-locked, to the burst signal contained in the chrominance component separated by chrominance separator 54. For this purpose, a burst gate 52 is coupled to the output of chrominance separator 54 and is actuated in response to the horizontal synchronizing signals which are separated by horizontal synchronizing signal separator 68. Thus, burst gate 52 transmits burst signals which are substantially free of time-base error from chrominance separator 54 to a phase comparator 62. A VCO 60 having an oscillating frequency equal to that of the burst signal, i.e., 3.58 MHz, is coupled to phase comparator 62 in a phase-locked loop arrangement. That is, the oscillating signal produced by VCO 60 is compared in phase comparator 62 to the burst signal included in the chrominance component which is supplied to terminal 50 by the video signal playback system shown in FIG 2. Any phase differential between the VCO output signal and the burst signal is detected by phase comparator 62 which supplies a corresponding error signal to VCO 60 so as to adjust the center frequency of the VCO. Thus, the oscillating signal produced by VCO 60 is synchronized to the burst signal included in the chrominance component and, therefore, is substantially free of time-base error. This 3.58 MHz signal is supplied to frequency converter 66 preferably via a divider 64 which serves to divide the frequency of the output of VCO 60 by a factor of 2.

Frequency converter 60 is adapted to mix the 3.58 MHz time-base error signal derived from VCO 72 with the $\frac{1}{2} \times 3.58$ MHz signal derived from VCO 60 and to supply the upper side band of these mixed signals to frequency converter 56. Thus, the frequency converting signal applied to frequency converter 56 has a frequency equal to $3/2 \times 3.58$ MHz, this signal containing the time-base error which is present in the horizontal synchronizing signal.

Frequency converter 56 mixes the frequency converting signal and the chrominance component to supply the upper side band of these signals to frequency converter 80. Thus, the subcarrier of the chrominance component is converted to a frequency of $5/2 \times 3.58$ MHz, and this converted subcarrier includes the time-base errors which are present in the horizontal synchronizing signal. Thus, frequency converter 56 supplies a frequency-converted chrominance component to frequency converter 80, this frequency-converted chrominance component containing the very same time-base errors which are present in the luminance component.

Frequency converter 80 is adapted to reconvert the chrominance component back to its original 3.58 MHz subcarrier frequency, but the reconverted chrominance component contains the time-base errors. To this effect, the signal whose frequency is divided by frequency divider 64 is supplied to a frequency multiplier 78. Consistent with the foregoing numerical example, multiplier 78 is adapted to multiply the frequency of the signal supplied thereto by a factor of 3. Thus, multiplier 78 supplies a frequency converting signal to frequency converter 80 having a frequency equal to $3/2 \times 3.58$ MHz. Frequency converter 80 is adapted to mix the frequency converted chrominance component produced by frequency converter 60 and the multiplied frequency signal produced by frequency multiplier 78 and to derive the lower side band component of these mixed signals. Thus, the resultant subcarrier frequency produced by frequency converter 80 is equal to 3.58 MHz. However, since the frequency converting signal supplied by frequency multiplier 78 is substantially free of time-base error but the frequency-converted chrominance component produced by frequency converter 56 contains the time-base error, it is appreciated that the frequency reconverted chrominance component produced by frequency converter 80, although exhibiting a subcarrier frequency equal to 3.58 MHz, also includes the time-base errors which are substantially identical to the time-base errors included in the luminance component.

The luminance component which had been separated by luminance separator 52 and the frequency-reconverted chrominance component produced by frequency converter 80 are combined in a combining circuit 82 so as to reform the composite color video signal. This reformed composite color video signal is applied to time-base corrector 14 (FIG. 1).

In the discussion presented thus far, the presence of a delay circuit 84, shown in FIG. 3, has been omitted. However, this delay circuit, which imparts a delay equal to the duration of one horizontal line interval, is an advantageous component of the illustrated apparatus. In order to best appreciate the results achieved by this component, the operation of the apparatus illustrated in FIG. 3 first will be described with the assumption that this delay circuit is omitted.

Figure 4:
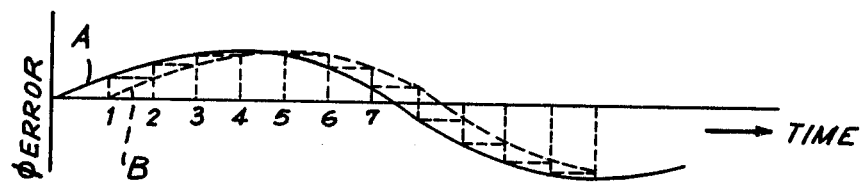
FIG. 4 is a graphical representation which is useful in understanding the advantages derived from the present invention.

Let it be assumed that the time-base error included in the luminance component is a phase-error which varies with respect to time in the manner represented by curve A, shown by the solid line in FIG. 4. For convenience, the time-axis is provided with demarcations spaced apart by one horizontal line interval. Thus, as shown, the phase error varies from one horizontal line interval to the next, and also substantially continuously throughout a horizontal line interval.

VCO 72 is phase-locked to the horizontal synchronizing signal. Hence, depending upon the phase differential between the local subcarrier reference signal produced by VCO 72 and the horizontal synchronizing signal at the beginning of each horizontal line interval, the local subcarrier reference signal is phase-adjusted accordingly. This means that, at the end of a horizontal line interval, although the phase error in the luminance component might have changed with respect to the phase error at the beginning of the horizontal line interval, this change in phase error is not yet imparted into the local subcarrier reference signal derived from VCO 72. This time lag in imparting the phase error into the local subcarrier reference signal is represented as the step wave shape shown by broken lines in FIG. 4. Because of this delay, the phase error, or time-base error, imparted into the chrominance component as a function of the phase error in the local subcarrier reference signal also lags the phase error in the luminance component by one horizontal line interval. That is, the time-base error which is imparted into the chrominance component is represented by curve B, shown as the broken line in FIG. 4. Thus, because VCO 72 can have its phase adjusted only at the beginning of each horizontal line interval, the time-base error imparted into the chrominance component, although substantially identical to the time-base error included in the luminance component, nevertheless lags the luminance component time-base error by one horizontal line interval.

In order to equalize the time-base error imparted into the chrominance component with the luminance component time-base error so as to eliminate the time lag represented in FIG. 4, delay circuit 84 is used. This delay circuit is capable of delaying either the luminance component alone or both the luminance and chrominance components for a duration equal to one horizontal line interval. However, it is important that this delay circuit not impart any delay to the received horizontal synchronizing signal. Accordingly, as shown in FIG. 3, delay circuit 84 may be interposed between input terminal 50 and luminance and chrominance separators 52 and 54. However, no delay circuit is interposed between input terminal 50 and horizontal synchronizing signal separator 68. As an alternative, delay circuit 84 may be provided only at the input to luminance separator 52 or, if desired, at the output of luminance separator 52. As yet another alternative, substantially equal delay circuits may be provided at each of the outputs of luminance and chrominance separators 52 and 54, respectively.

By using delay circuit 84, the time-base error imparted into the chrominance component still can be represented as curve B shown in FIG. 4. However, since the luminance component is delayed with respect to the horizontal synchronizing signal, this has the effect of shifting curve A to the right by one horizontal line interval. Consequently, curves A and B are substantially coincident. That is, the time-base error now imparted into the chrominance component is equalized with the time-base error in the luminance component. Therefore, the composite color video signal produced by combining circuit 82 has luminance and chrominance components which contain substantially equal time-base errors. These errors can be corrected by time-base corrector 14 without any undesirable effects which heretofore might have occurred because of the time lag between the time-base errors which were present in the luminance and chrominance components, respectively.

The foregoing has described how time-base errors are introduced into the local subcarrier reference signal derived from VCO 72, and how this local subcarrier reference signal is used to frequency convert the chrominance component to a different subcarrier frequency containing such time-base errors. Frequency converter 80 is provided to reconvert the frequency-converted chrominance component back to its original subcarrier frequency, yet maintaining the time-base errors in the reconverted chrominance component. Turning now to FIG. 5, another embodiment of time-base error adjustment apparatus 12 is illustrated. Many of the elements shown in FIG. 5 are substantially the same as corresponding elements described hereinabove with respect to FIG. 3. Accordingly, these common elements retain the same reference numerals. Thus, as shown, delay circuit 84 adds a delay equal to one horizontal line interval to the composite color video signal received at terminal 50. The delayed signal is separated into its luminance and chrominance components by luminance separator 52 and chrominance separator 54, respectively. In addition, the horizontal synchronizing signal included in the received composite video signal is separated therefrom by horizontal synchronizing separator circuit 68. As also shown in FIG. 3, VCO 72 is phase-locked to the horizontal synchronizing signal such that a local subcarrier reference signal is derived therefrom containing the time-base error included in the horizontal synchronizing signal.

Burst gate 58 is coupled to the output of chrominance separator 54 and is adapted to transmit the burst signal included in the chrominance component to an oscillator 92. Oscillator 92 is a continuous wave oscillator, such as a ringing circuit, a color lock oscillator, or the like. The oscillating signal generated by oscillator 92 is locked in phase and frequency to the burst signal which is included in the chrominance component separated by chrominance separator 54. This local oscillating signal thus is synchronized to the subcarrier upon which the color information signals are modulated in the chrominance component.

The output of oscillator 92 is coupled to a decoder 90 which also receives the chrominance component from chrominance separator 54. Decoder 90 is conventional and may be of any type which now is used in color television receivers for decoding the color information signals which are modulated onto the color subcarrier. Thus, the outputs of decoder 90 essentially are color information signals, such as R-Y and B-Y color difference signals. If desired, decoder 90 may of the type which also produces color difference signal G-Y. As yet another alternative, decoder 90 may be of the type which generates the I and Q color information signals.

The decoded color information signals produced by decoder 90 are coupled to an encoder 94. The purpose of this encoder is to modulate the color information signals onto a color subcarrier. Accordingly, encoder 94 may be of any typical type which is used in color television transmission or broadcasting systems. The subcarrier which is modulated with the color information signals produced by decoder 90 is the local subcarrier reference signal which is derived from VCO 72. Thus, encoder 94 produces a chrominance component whose subcarrier contains the time-base errors included in the luminance component, and particularly in the horizontal synchronizing signal, of the composite color video signal which is reproduced by the video signal playback system of FIG. 2 and applied to terminal 50. The output of encoder 94 is substantially the same as the output of frequency converter 80 described hereinabove with respect to FIG. 3. This chrominance component, whose original subcarrier has been replaced by the local subcarrier reference signal containing the time-base errors, is combined in combining circuit 82 with the luminance component separated by luminance separator 52 so as to reform the composite color video signal with equalized time-base errors in both the luminance and chrominance components.

Figure 5:
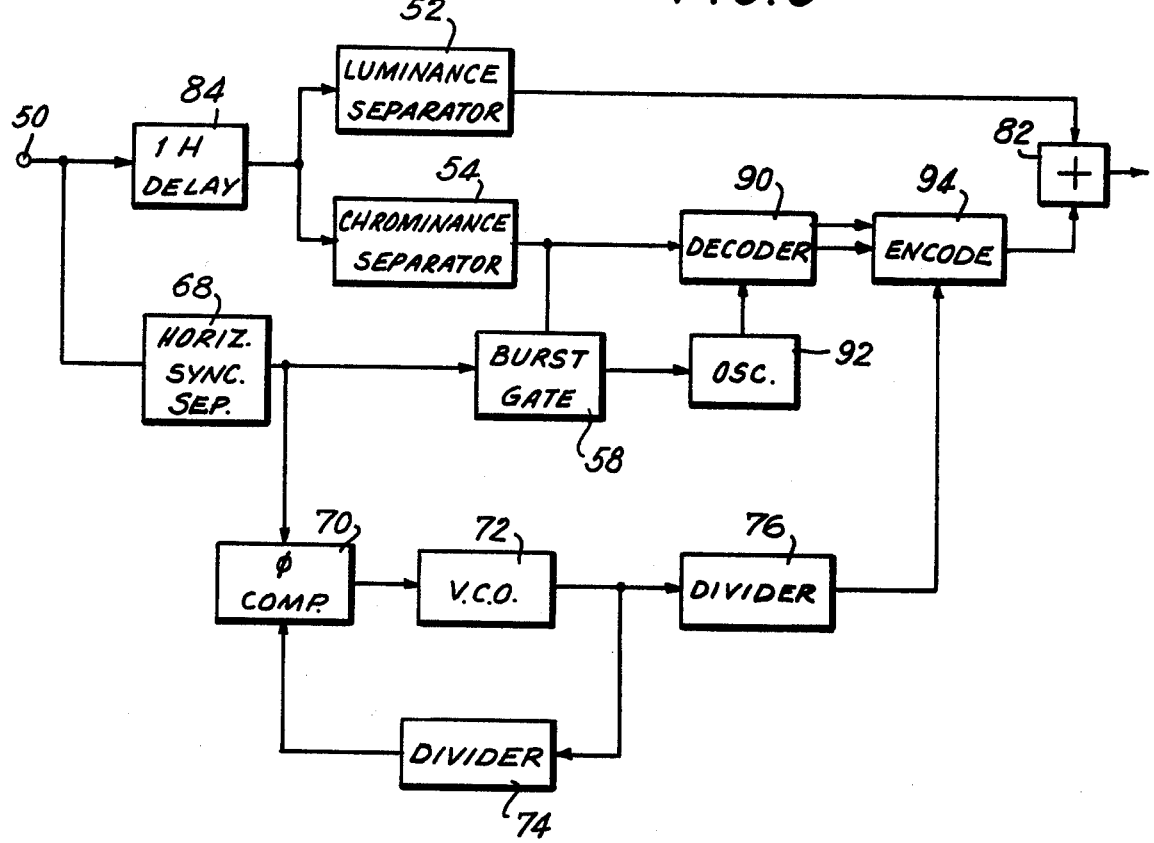
FIG. 5 is a block diagram of another embodiment of this invention.

Thus, in both the embodiments shown in FIGS. 3 and 5, a local subcarrier reference signal is produced to contain the time-base errors which are present in the luminance component reproduced by a video signal playback system. This local subcarrier reference signal replaces the chrominance subcarrier in the reproduced composite color video signal. Thus, the resultant chrominance component is provided with the very same time-base errors which are present in the luminance component. As a result thereof, the luminance and chrominance components can be combined into a composite color video signal; and this composite color video signal can be satisfactorily processed by a time-base corrector.

While the present invention has been particularly shown and described with reference to preferred embodiments thereof, it should be readily apparent that various changes in form and details can be made by one of ordinary skill in the art without departing from the spirit and scope of the invention. For example, the various dividing and mulitplying ratios described with respect to FIGS. 3 and 5 can be modified, as desired. Still further, although the upper side bands have been derived by frequency converters 56 and 66, if desired, one or both can be used to derive the lower side band. Still further, depending upon the frequency dividing factor selected for frequency divider 64, frequency multiplier 78 may be omitted.

Therefore, it is intended that the appended claims be interpreted as including the foregoing as well as other such modifications and changes.

What is claimed is:

1. Apparatus for compensating time-base errors introduced into a composite color video signal reproduced by a video signal playback system, the composite color video signal including luminance and chrominance components and a horizontal synchronizing signal, said apparatus comprising:
   means for receiving said composite color video signal from said video signal playback system;
   separating means for separating said luminance and chrominance components from said received composite color video signal;
   means for detecting time-base errors in said received composite color video signal;
   local oscillator means for generating a local subcarrier reference signal containing the time-base errors detected in said received composite color video signal;
   means coupled to said local oscillator means and said separating means for substituting said subcarrier reference signal for the reproduced subcarrier of said chrominance component;
   delay means for imparting a time delay to at least said luminance component, said time delay being equal to one horizontal line interval of said composite color video signal; and
   combining means coupled to said separating means and to said substituting means for combining said delayed luminance component and the substituted-subcarrier chrominance component into a reformed composite color video signal.

2. The apparatus of claim 1 wherein said delay means is interposed between said receiving means and said separating means for imparting said time delay to both said luminance component and said chrominance component.

3. The apparatus of claim 1 wherein said time-base errors are present substantially only in said luminance component, and said means for detecting time-base errors comprises horizontal synchronizing signal separator means for separating the horizontal synchronizing signal included in said reproduced composite color video signal, said horizontal synchronizing signal having the time-base errors introduced into said luminance component.

4. The apparatus of claim 3 wherein said local oscillator means comprises a controllable oscillator; and a phase comparator coupled to said controllable oscillator and to said horizontal synchronizing signal separator means for comparing the phase of the oscillating signal produced by said controllable oscillator with the phase of said horizontal synchronizing signal and for modifying the oscillating signal produced by said controllable oscillator in accordance with a phase difference between said local oscillating signal and said horizontal synchronizing signal.

5. The apparatus of claim 4 wherein said means for substituting comprises first frequency converting means responsive to said local oscillating signal for converting the subcarrier frequency of said separated chrominance component to a different frequency containing the time-base errors in said horizontal synchronizing signal; means for generating a signal synchronized with the subcarrier of said separated chrominance component and having a frequency equal to the difference between said different frequency and said subcarrier frequency; and second frequency converting means responsive to said generated signal for reconverting the different subcarrier frequency of the output of said first frequency converting means back to the subcarrier frequency of said separated chrominance component, but containing said time-base errors.

6. The apparatus of claim 5 further comprising mixer means for mixing said local oscillating signal and a submultiple of said generated signal to produce a first converting signal whose frequency is equal to an odd multiple of one-half the subcarrier frequency of said separated chrominance component, said first converting signal being applied to said first frequency converting means to convert the subcarrier frequency of said separated chrominance component to said different frequency.

7. The apparatus of claim 4 wherein said means for substituting comprises decoding means for decoding said separated chrominance component into color information signals; and encoding means for receiving said color information signals and responsive to said local oscillating signal for encoding said color information signals onto said local oscillating signal as the subcarrier therefor.

8. For use with a video signal playback system of the type which reproduces a previously recorded composite color video signal having luminance and chrominance components and horizontal synchronizing signals separated by horizontal line intervals, and wherein time-base errors appear in said luminance component and said horizontal synchronizing signals but not in said chrominance component, apparatus for modifying said chrominance component so as to have corresponding time-base errors, comprising:

means for receiving said composite color video signal from said video signal playback system;
  luminance component separating means for separating said luminance component from said received composite color video signal;
  chrominance component separating means for separating said chrominance component from said received composite color video signal;
  horizontal synchronizing separator means for separating said horizontal synchronizing signals from said received composite color video signal;
  local oscillator means for generating a local subcarrier reference signal;
  a phase-lock loop coupled to said local oscillator means and responsive to each separated horizontal synchronizing signal to lock said local subcarrier reference signal thereto, such that said local subcarrier reference signal contains said time-base error of the immediately preceding separated horizontal synchronizing signal for a full horizontal line interval duration;
  replacement means coupled to said chrominance component separating means and responsive to said local subcarrier reference signal for replacing the subcarrier of said received chrominance component with said local subcarrier reference signal containing said time-base errors;
  delay means for delaying said received luminance component and said received chrominance component, but not said separated horizontal synchronizing signal, for a duration equal to one horizontal line interval; and
  combining means for combining the delayed luminance component and the delayed chrominance component with the replaced subcarrier into a reformed composite color video signal containing time-base errors.

9. The apparatus of claim 8 wherein said replacement means comprises an oscillator for generating an oscillating signal synchronized with the subcarrier of said received chrominance component; first frequency converting means coupled to said chrominance component separating means and responsive to said phase-locked local subcarrier reference signal to frequency convert said chrominance component and thereby impart said time-base errors into the frequency converted chrominance component; and second frequency converting means coupled to said first frequency converting means and responsive to said oscillating signal to frequency reconvert said frequency converted chrominance component back to its original frequency but containing said time-base errors.

10. The apparatus of claim 8 wherein said replacement means comprises decoding means for decoding said separated chrominance component into color information signals; and encoding means for receiving said color information signals and said phase-locked local subcarrier reference signal for encoding said color information signals onto said local subcarrier reference signal.

* * * * *